TABLE I

| PROGRAM AND COUPLING CONTROL TABLE |
|---|
| PROGRAM GROUP: A, B, C, D |
| OUTPUTS: 2-9*, 4-10*, 6-11*, 8-12* |
| OUTPUTS: 1, 3, 5, 7 with control points $A_1$, $A_3$, $B_1$, $B_3$, $C_1$, $C_2$, $D_1$, $A_2$, $B_2$, $D_2$ |
| ⊘ = CONTROL POINTS |
| * = OUTPUTS 9,10,11 AND 12 ARE USED FOR "ON-ON" CIRCUITS |

FIG-18

TABLE II

| POS | A | B | C | D |
|---|---|---|---|---|
| 1 | ● | ⊕ | ⊕ | ⊕ |
| 2 | ○ | ⊕ | ⊕ | ⊕ |
| 3 | ⊕ | ● | ⊕ | ⊕ |
| 4 | ⊕ | ○ | ⊕ | ⊕ |
| 5 | ⊕ | ⊕ | ● | ⊕ |
| 6 | ⊕ | ⊕ | ○ | ⊕ |
| 7 | ⊕ | ⊕ | ⊕ | ● |
| 8 | ⊕ | ⊕ | ⊕ | ○ |

FIG-19

ADJUSTMENT LEGEND:
○ = SCREW HEAD FLUSH WITH SURFACE
⊕ = CLOCKWISE 1/2 TURN
● = BOTTOM SCREW INTO CAVITY

LEGEND ○

FIG-20

LEGEND ⊕

FIG-21

LEGEND ●

Nov. 5, 1968   R. MINCONE   3,409,747
PROGRAMMABLE THUMBWHEEL SWITCH
Filed March 6, 1967   10 Sheets-Sheet 10

FIG-28

United States Patent Office 3,409,747
Patented Nov. 5, 1968

3,409,747
PROGRAMMABLE THUMBWHEEL SWITCH
Raymond Mincone, Plainedge, N.Y.
(30 Fleetwood Ave., Melville, N.Y. 11746)
Filed Mar. 6, 1967, Ser. No. 628,206
10 Claims. (Cl. 200—11)

ABSTRACT OF THE DISCLOSURE

This invention relates to a thumbwheel switch which is adapted to be programmed as desired. The programming is done by adjusting threaded control elements located through oval apertures in a removable cover plate disposed on one side of the switch and adjusting, as required, threaded controls located in the housing on the opposite side to the cover plate. This switch comprises four basic pieces, namely, a slotted cover plate, a thumbwheel, a printed circuit card and a housing.

---

Prior art rotary thumbwheel switches having printed circuits, employ a metal wiper contact having a rotary sliding action against a stationary printed contact. These prior art printed circuits cannot be altered so as to give selectivity of circuits by the user.

According to this invention, selectivity is provided within the switch, so that the operator of the switch may program it to his specific needs. Thus, according to this invention, one or more input circuits may selectively be routed within the switch to yield selectively made output circuits. For example, a single circuit input may be divided into as many as twelve output circuits within the switch.

According to this invention, a position selector is provided in the cover to limit the degree of rotation of the thumbwheel. The cover plate also permits manipulation of the poles on the printed circuit card through oval openings therein. Such manipulation of the poles programs the switch. The poles are in effect switches within the thumbwheel switch.

The metal adjustable screw threaded electrical control inserts or elements are of conventional two piece construction and are preferably molded into the plastic thumbwheel and also into the side of the plastic housing.

This invention is of generic scope but it is illustrated herein by means of a specific embodiment shown in the accompanying drawing in which.

Figures 14, 15, 16, 17:
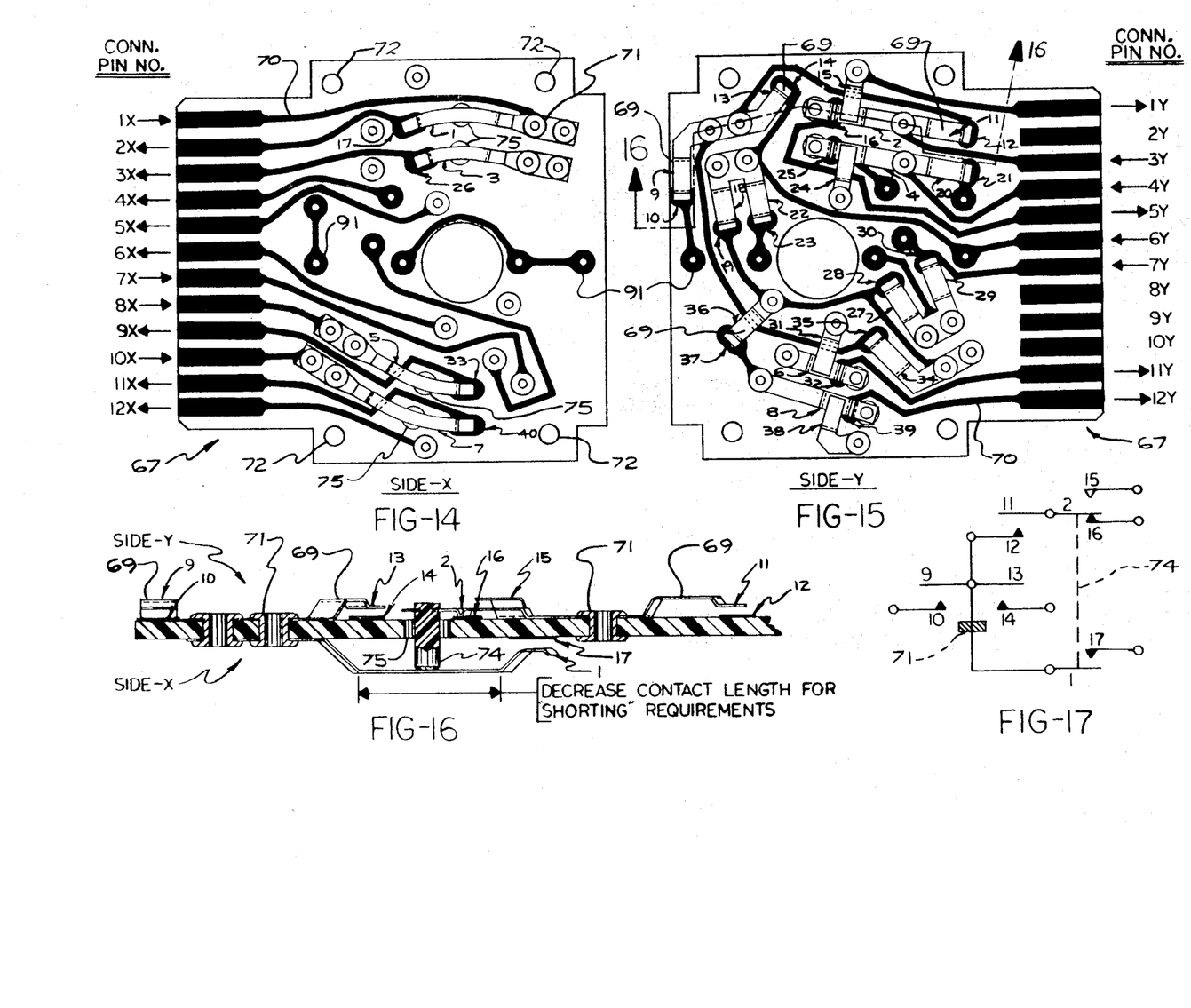
FIG. 14 is a view of the X-side of the printed circuit card showing four movable poles numbered 1, 3, 5, 7 adjusted through the oval slots of the cover plate in conjunction with the control elements on the thumbwheel.
FIG. 15 is a view of the Y-side of the printed circuit card showing the movable poles numbered 2, 4, 6, 8 and the movable contacts engaged from the control elements located in the housing side wall.
FIG. 16 is a section view taken on line 16—16 of FIG. 15 and showing the manner of using metal rivets to engage printed circuits to metal leaf spring poles and to the separate contacts and showing how selective adjustment of a pole on the X-side effects a co-acting pole or contact on the Y-side and also showing the manner of obtaining shorting of poles 1, 3, 5, 7 from the non-shorting arrangement shown by decreasing the length of the poles between the arrow heads shown, at the time of manufacture.
FIG. 17 is a schematic diagram showing the operation of the detailed portion of the printed circuit card shown in FIG. 16.
Figure 23:
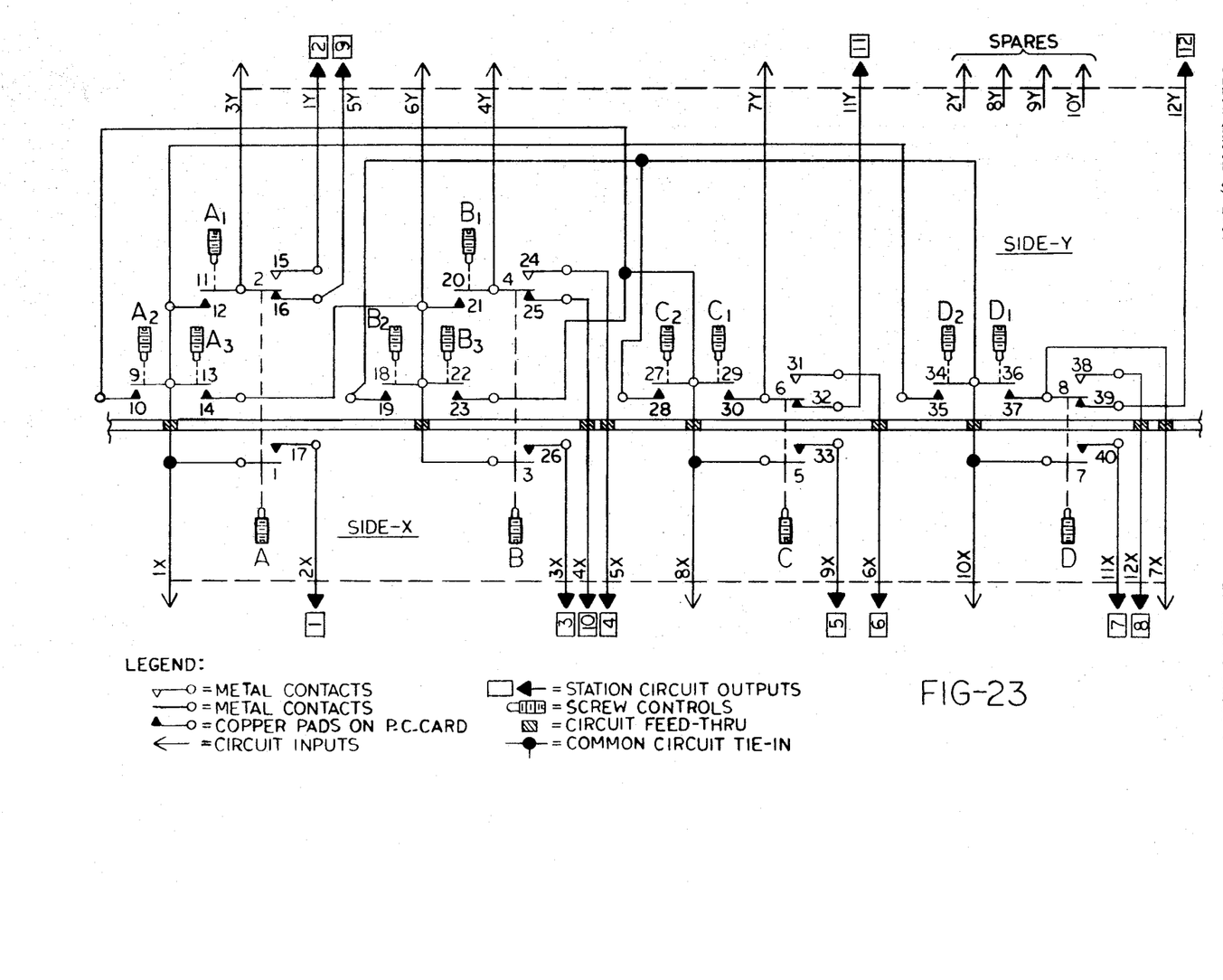
FIG. 23 is a schematic layout of the printed circuit card and of the control inserts disposed on each side thereof and indicating the various programmable operations relative thereto.
Figure 24:
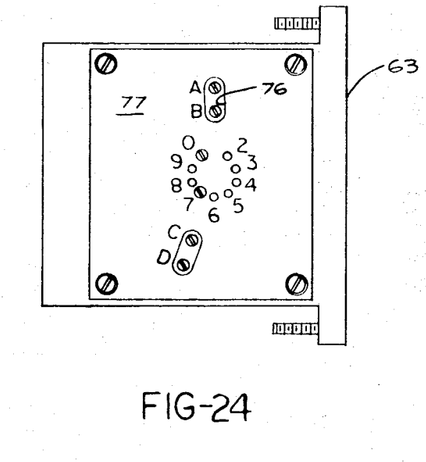
FIG. 24 is a cover side view of the assembled switch.
Figure 25:
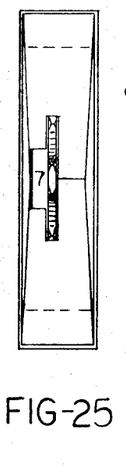
FIG. 25 is a front view of the assembled switch.
Figure 26:
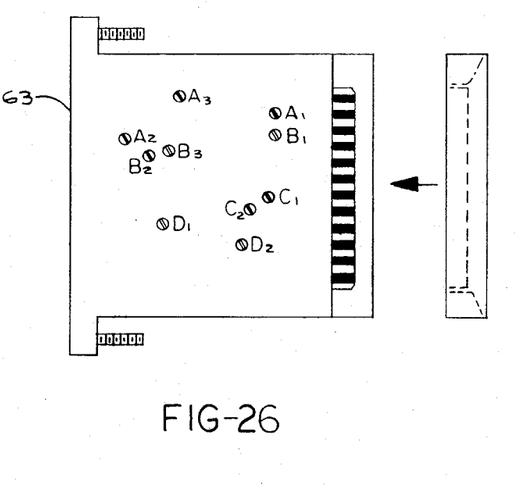
FIG. 26 is a housing side view of the assembled switch with its rear connector block removed to show the manner in which the printed circuit card extends into the rear cavity of the housing.
Figure 27:
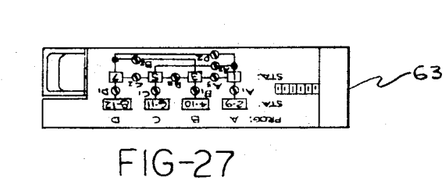
FIG. 27 is a top view of the assembled switch showing indicia printed thereon for guidance in coupling of output circuits to one or more input circuits.
Figure 28:
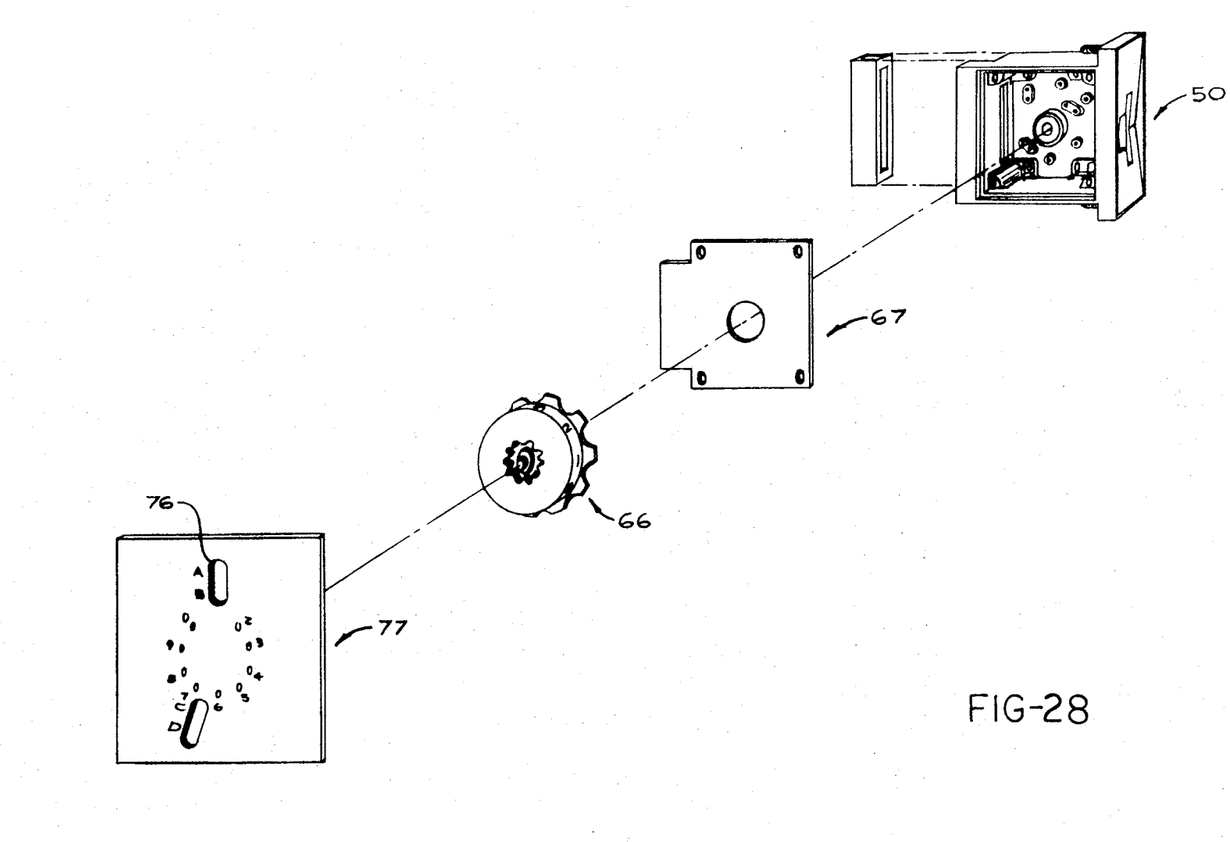
FIG. 28 is an exploded view of the switch showing its four main parts in simplified form.

In the specification herein, the numbers 1 through 40 are used to correlate the printed circuit card FIGS. 14, 15 and 16 to the schematic electrical layout circuit shown in FIG. 23.

According to this invention, the switch is composed of four main components, namely, the housing, the printed circuit card, the thumbwheel with its control elements predeterminedly located therein and a removable cover plate having a pair of elongated slots to permit access to the control elements on the thumbwheel.

Figure 5:
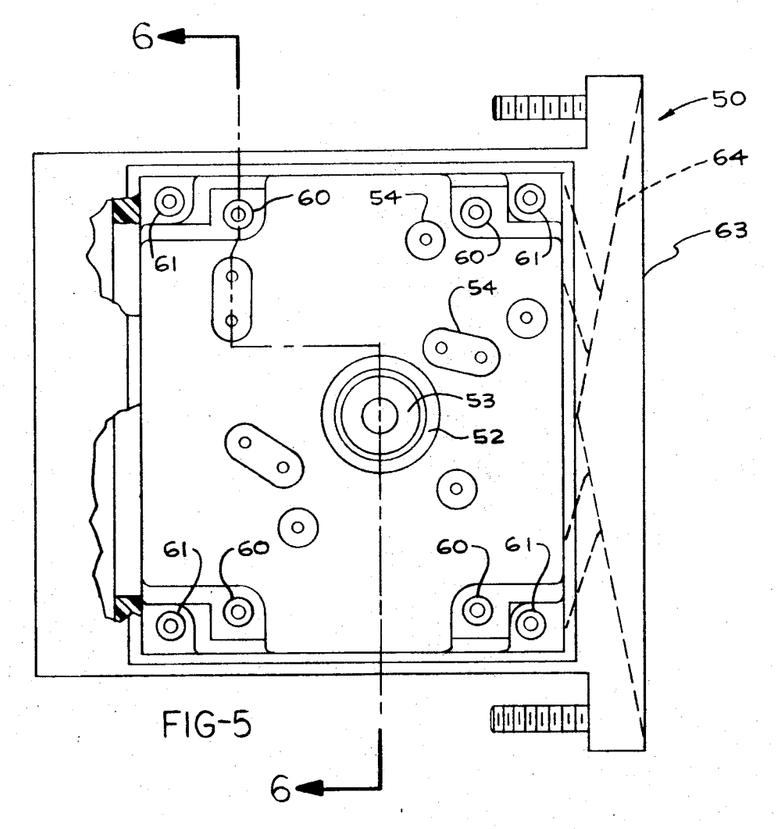
FIG. 5 is an interior view of the plastic housing, broken away in part to show its rear wall slotted construction to permit passage of the printed circuit card and showing by dotted outline the sunken opening in the front wall.
Figure 6:
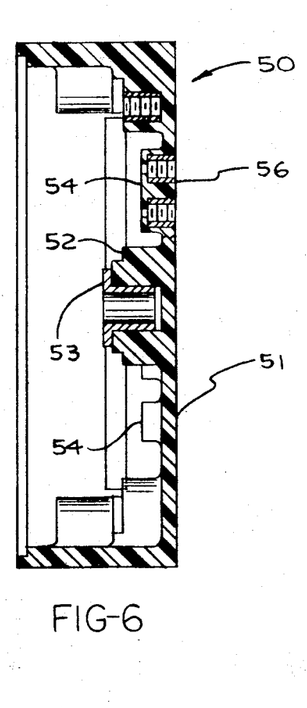
FIG. 6 is a section view taken on line 6—6 of FIG. 5 and showing the manner of molding the threaded cylinders of the inserts in the plastic housing and the manner of fixing the axle receiving metal bushing in said housing.

Turning to the drawing and to FIGS. 5 and 6, an integral plastic substantially rectangular inner cavity containing housing 50 is provided with side wall 51 having a centrally located boss 52. A metal bearing 53 for the axle of the thumbwheel is molded in the boss. The inner surface of the housing is provided with integral stubs 54 having apertures in which conventional two piece threaded control elements or inserts 55 (FIG. 12) are molded fixedly in place. The elements 55 are made from an inner threaded barrel or cylinder 56 and a threaded bolt 57 having a slot 58 therein at one end to receive a screw driver and a threaded bolt prong 59 on the other end for engaging a movable leaf spring element, pole or contact, on the card.

The interior of the housing 50 is also provided with threaded metal wells 60 adapted to receive bolts to hold the card in place and with metal wells 61 adapted to bolts holding the removable cover plate in place.

The front of the housing 50 (FIG. 5) is provided with an elongated vertical wall 63 having inwardly sloped opposing surfaces 64 terminating in a T-shaped aperture 65 to permit protrusion of the thumbwheel 66 without extending beyond the housing front wall.

A printed circuit card 67 (FIGS. 14 and 15) is provided with movable poles numbered 1 through 8, located on the X-side and the Y-side of the card. The contacts are engaged through the side 51 of the housing and are numbered generally as 69, and specifically as 9, 11, 13, 18, 20, 22, 27, 29, 34 and 36.

Figure 1:
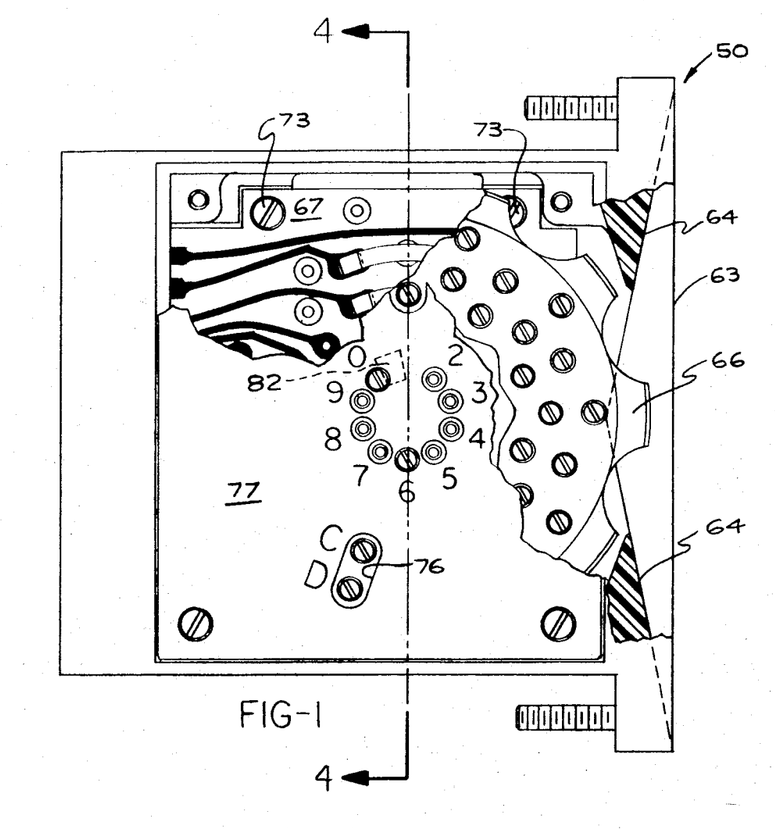
FIG. 1 is a side view, partly in section and broken away in part to show the removable cover, the thumbwheel therebelow, then the printed circuit card and lastly the plastic housing having a sunken opening in its front wall through which the thumbwheel projections pass.
Figure 2:
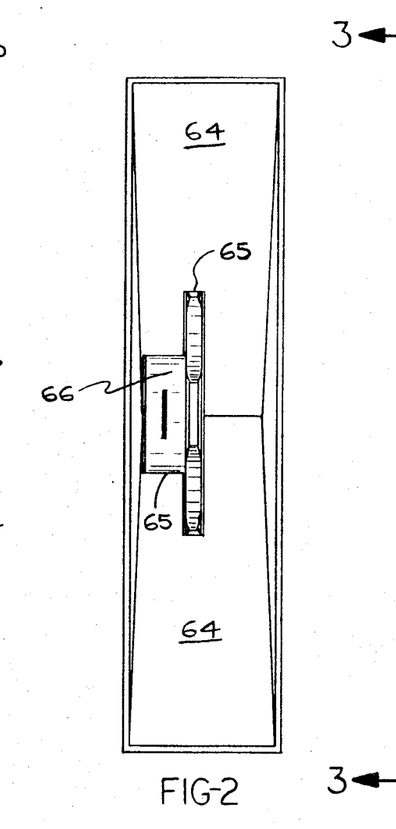
FIG. 2 is a front elevation view of the switch showing the thumbwheel disposed in the sunken opening, thereby preventing the projections of the wheel from protruding beyond the plane of the front wall.
Figure 3:
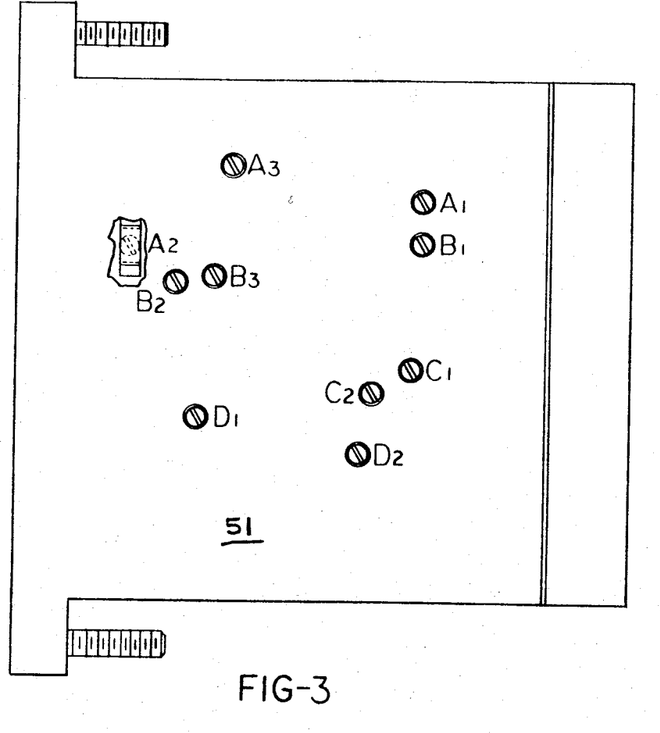
FIG. 3 is a side view of the housing taken on line 3—3 of FIG. 2, the side wall being broken away in part to show the printed circuit card located thereunder.
Figure 4:
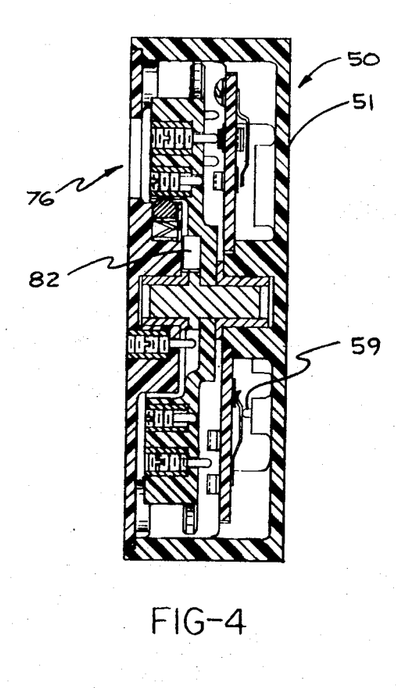
FIG. 4 is a sectional view taken on line 4—4 of FIG. 1 and showing the superimposed relationship of the plastic cover plate upon the substantially rectangular housing and showing the manner of mounting the thumbwheel in the cover plate and in the housing, and further showing the manner of mounting the printed circuit card with its movable poles and movable contacts to the housing, and also showing the relationship of the adjustable control inserts of the thumbwheel and the housing to the movable elements on the card.

The poles and contacts are secured to the printed circuits, generally indicated as 70, by means of metal rivets 71. The card 67 is made of rigid plastic material and is provided with four apertures 72 for bolts 73 (FIG. 1) for securing to wells 60 of the housing, and with copper plated holes 91 for circuit transfer therethrough.

Figure 7:
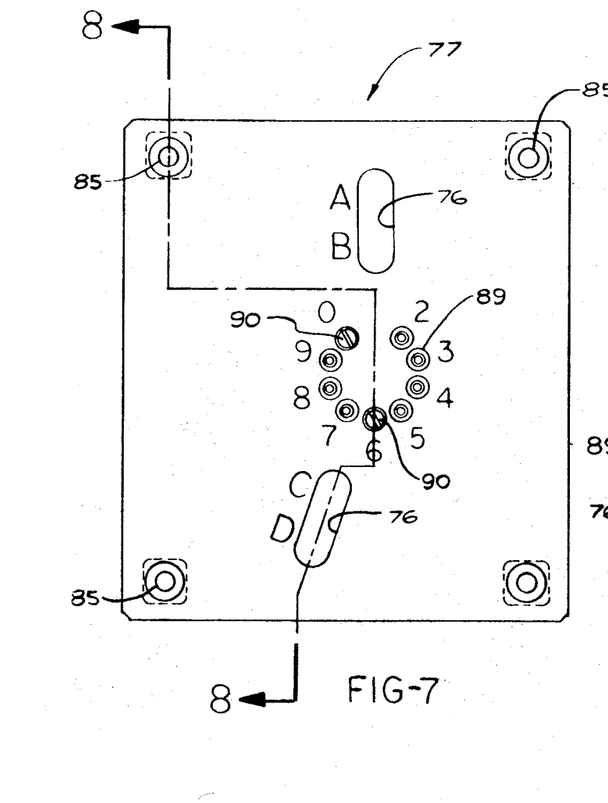
FIG. 7 is a view of the cover plate with four corner apertures for bolting into the housing and showing a pair of programming slots and nine circularly disposed threaded inserts or position pins for limiting the rotation of the thumbwheel.
Figure 8:
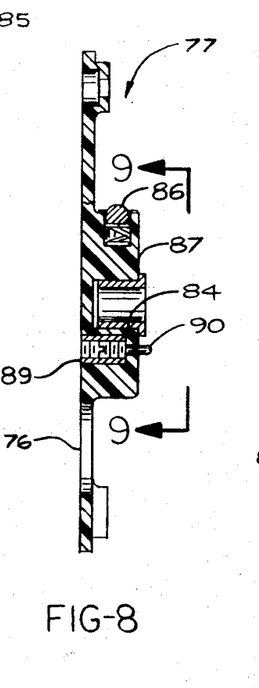
FIG. 8 is a section view taken on line 8—8 of FIG. 7 showing the ball means used to arrest the movement of the thumbwheel and showing the removable threaded insert pins used to limit the rotation of the thumbwheel.
Figure 9:
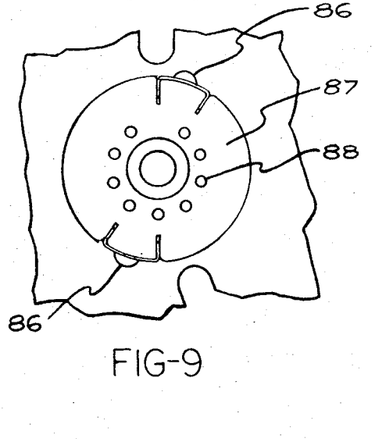
FIG. 9 is a detail view taken on line 9—9 of FIG. 8 and showing the use of two balls for effective locking of the thumbwheel in a selected position.
Figure 10:
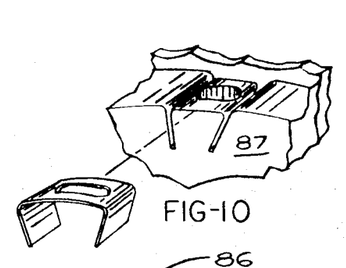
FIG. 10 is an exploded detailed view showing the manner of using a clip to retain the ball on the hub of the cover plate.

As shown in detail in FIG. 16, movement of leaf spring contact pole 1 moves the insulator post 74 in engagement therewith. By suitably adjusting the insert bolts 57 of the thumbwheel, the poles on the X-side are engaged through the slots 76 of the cover plate 77 (FIGS. 7 and 8). Pole 1 is moved by a prong 59 located in the thumbwheel 66. This forces post 74 upwardly breaking contact between pole 2 and printed circuit 16. Further movement of the post 74 effects a contact with contact 15 on the Y-side of the card while simultaneously effecting a contact between pole 1 and printed circuit 17 on the X-side of the card. This feature of simultaneous actuation of poles on each side of the card by operation through the card is of prime importance to this invention.

Turning now to the thumbwheel (FIGS. 11 and 12 and 13), it is made of plastic and is provided with a plurality of preselected control elements 55. The thumbwheel is provided with a plurality of peripherally disposed finger operable projections 80, each co-acting with a respective V-shaped locking groove 81 molded in an interior cavity. It is also provided with an integral abutment 82 in order to limit the rotation as hereinafter described.

Figure 11:
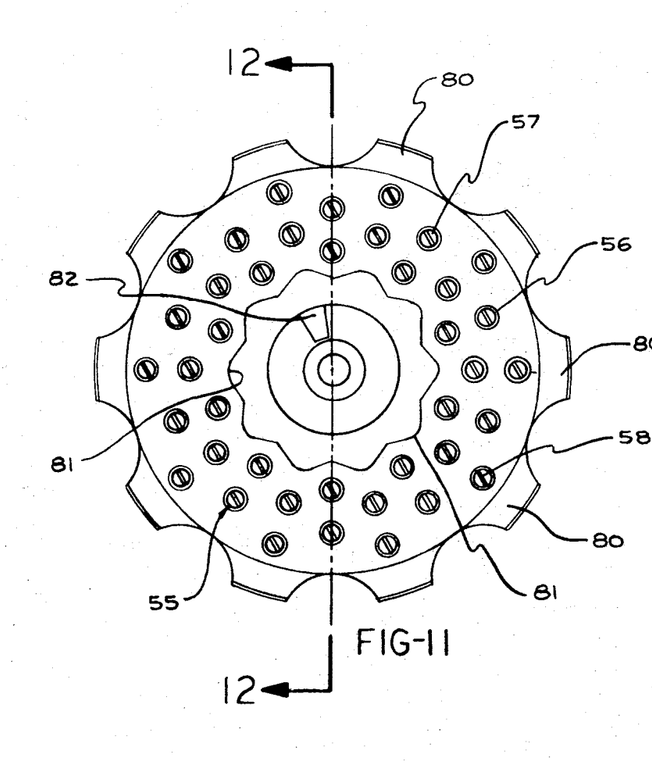
FIG. 11 is a side view of the thumbwheel showing the plurality of critically located molded in place adjustable metal control inserts and showing an integral truncated triangular abutment for engaging a position pin located in the cover plate.
Figures 12, 13:
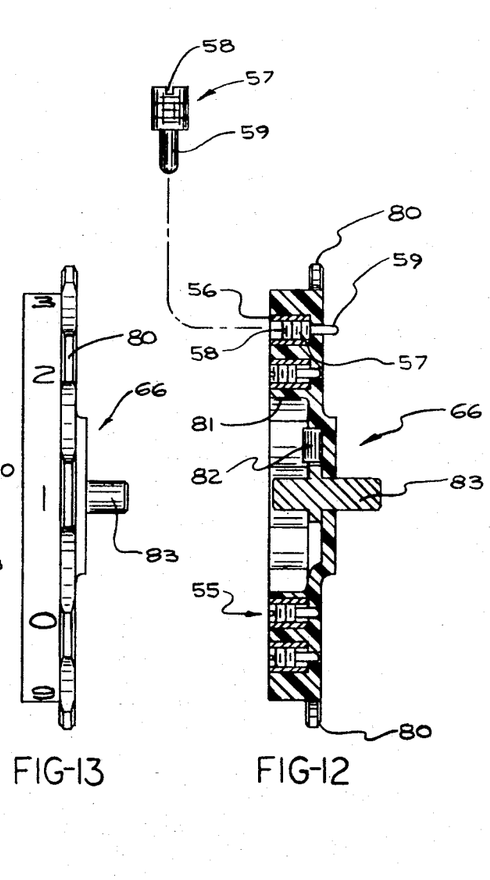
FIG. 12 is a section view of the thumbwheel taken on line 12—12 of FIG. 11 showing the axle and the manner of inserting a threaded bolt into a molded in place insert cylinder.
FIG. 13 is a front view of the thumbwheel.

Moreover, the thumbwheel 66 is provided with a molded in place axle 83 which projects into the bearing 53 of the housing 50 and into a bearing 84 of the cover plate 77.

The cover plate 77 (FIG. 7 and to 10) is of plastic rectangular construction having a bearing 84 in its center. A pair of critically positioned elongated slots 76 are provided to permit access to the control elements 55 on the thumbwheel 66. Also a plurality of apertures 85 are provided in the corners to allow securing by bolts to wells 61 of the housing.

The cover plate 77 is also provided with a pair of conventional spring loaded locking balls 86 in its hub 87 adapted to engage a respective groove 81 of the thumbwheel. Thus, the rotation of the thumbwheel is done in a stepwise manner in ten numbered steps designated on the thumbwheel.

As shown in FIG. 7, the cover plate has nine circularly disposed apertures 88, each having a threaded metal insert 89 to receive a threaded stop pin 90. A pair of stop pins 90 are provided which when fully threaded inwardly (FIG. 8) engage the abutment 82 thereby limiting the rotation of the thumbwheel between the two pins. When both pins are fully returned in the inserts 89, the thumbwheel may be continuously rotated. In practice generally two pins 90 are used, depending upon the number of positions desired.

A pole as used herein is an input movable contact on one side of the printed circuit card used in conjunction with an intermediate post contacting an input movable pole on the other side of the printed circuit card. Also if six positions are selected as indicated on the cover plate by use of the stop pins 90, then six programs may be programmed through slots 76 onto the thumbwheel 66.

This switch allows the user to select whether the poles are to function in an on-on or in an on-off manner. It also allows the user to select the pattern of circuit transfer to various outputs per position. The switch is universal in that it may be programmed at will without being disassembled. It has fixed poles and fixed contacts and so uses no electrically coupled rotor. It has selectivity as to the positions required, as to outputs required through slots 76 of the cover plate and as to the common poles required by operation of the coupling controls $A_1$ to $D_2$ on the housing wall 51.

Figure 18:
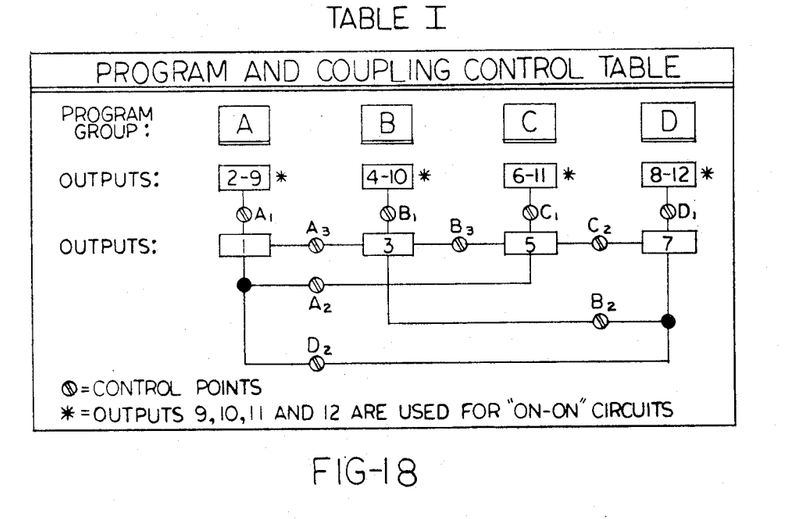
FIG. 18 is Table I showing the versatility of programming the output leads to one or more common circuits.

A feature of this invention is the manner of coupling to a common circuit. In this connection, the control elements shown in Table I are also known as coupling controls. They function independently or in conjunction with each other for the sole purpose of coupling two or more outputs to an input circuit. To couple outputs within a program A of slot 76, control $A_1$ is used; to couple outputs within program B, control $B_1$ is used, etc. For example, by bottoming control $B_1$, output 3 is coupled to output 4 and 10; by bottoming control $D_1$, output 7 is coupled to output 8 and 12.

To couple outputs within one program group to another program group, controls $A_2$, $A_3$, $B_2$, $B_3$, $C_2$ or $D_2$ are bottomed as required. Selections are made by referring to Table I and selecting the controls from a left to right basis, without back-tracking. For example, to couple outputs within program group A to program group C, bottom control $A_2$; to couple outputs within program group A to program groups C and D, bottom controls $A_2$ and $C_2$.

Another feature of this invention, is the manner of selectively programming outputs in a given switch position. Each program group, whether A, B, C or D, as seen in Table I or FIG. 23, has control over three outputs. Thus, program group C controls outputs 5, 6 and 11. Clearly there is selectivity as to the outputs to be activated in any given thumbwheel position. However, switching functions within a given program group, once selected through connector wiring will be maintained throughout the switching cycles. For example, outputs 1 and 2 may be selected to operate independently or collectively within a program group, but cannot be made to do both. Hence, outputs 1 and 2 may be activated on-on or on-off within a given position but do not function independently in the following position.

Figure 20:
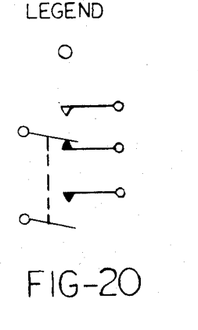
FIG. 20 is a schematic representation of the effect of having a threaded control of a pole 1, 3, 5, 7 in a non-actuated position.
Figure 21:
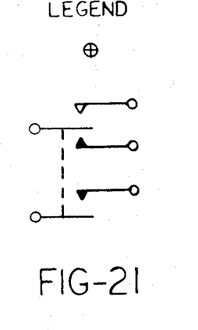
FIG. 21 is a schematic representation of the poles of FIG. 20 when making a half turn of a control insert to obtain a breaking of all contact points with the printed circuit.
Figure 22:
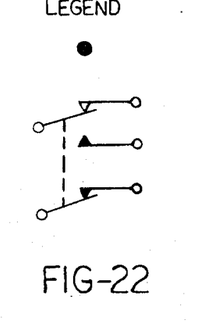
FIG. 22 is similar to FIG. 21 showing the effect of making a full insertion of the control element.

This action also holds true in reverse. Thus whereas output 1 functions in a given position and output 2 functions in the following position, output 1 and 2 do not function together in any one position. Therefore, the selection of any two poles within a given program group is dependent upon the selectivity of the user in relation to the connector hook-up. Outputs for a given position is accomplished by varying the amount of adjustment effected on each program group through the oval openings 76 in the cover plate. FIGS. 20, 21 and 22 are schematic showings of the effect of the three operable adjustments and how they effect the output circuits.

The following two examples illustrate the manner of operation.

*Example I*

Figure 19:
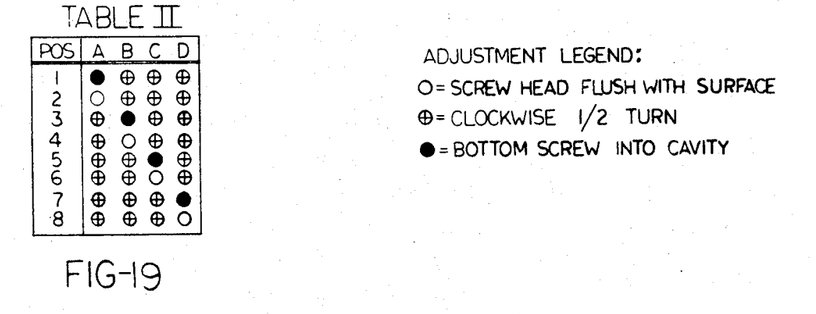
FIG. 19 is Table II showing the adjustments possible with the control elements in various threaded engagement, for Examples I and II.

An input circuit is to be transformed into eight output circuits. Output one is associated with position one on the thumbwheel, output two with position two, etc., up to output eight. To accomplish this result, thread a stop pin 90 into the number eight opening on the cover plate. Then fully thread in the adjusments $A_1$, $A_3$, $B_1$, $B_3$, $C_1$, $C_2$ and $D_1$ as shown in Table I. To activate the desired outputs at a given position on the thumbwheel, make adjustments A, B, C and D as outlined in Table II, through the apertures 76 of the cover plate.

*Example II*

An eight circuit input is transformed into eight independent outputs which are to operate as follows: output one in position one on the thumbwheel, output two in position two, etc., up to output eight. Program the switch as follows: set the position stop pin 90 into the number eight opening in the cover plate. No coupling of poles is required. Therefore adjustments are not needed on the housing side. To actuate the desired outputs at a given position, actuate adjustments A, B, C and D as outlined in Table II, through the apertures 76 of the cover plate.

I claim:

1. An electrical thumbwheel switch having superimposed fundamental units comprising a housing having an inner cavity and a side wall having adjustable circuit control inserts therein; a printed circuit card having a plurality of printed circuits, movable poles and movable contacts thereon, selectively connecting said poles and contacts among the various circuits, disposed in the cavity of the housing; a selectively rotatable thumbwheel having an axle and an abutment and circumferentially disposed rows of critically located adjustable control inserts therein, disposed adjacent said card; and a cover plate having spaced apart critically located elongated apertures providing access to pole engaging inserts on said thumbwheel, said axle of said thumbwheel being disposed on one side in said cover plate and on the other side through said printed circuit card into said housing.

2. The switch of claim 1 comprising said housing having a front wall having a recessed aperture therein for suitable protrusion of said thumbwheel therein without extending beyond said housing front wall.

3. The switch of claim 1 comprising said printed circuit card having selectively movable poles on a first or X-side and selectively movable poles on the second or Y-side co-acting with the poles on said first side, said poles on the Y-side being adjustable to open a contact with a printed circuit and then on further movement to make a contact with another printed circuit.

4. The switch of claim 3 comprising said card having movable contacts on the Y-side to engage printed circuits upon selective adjustment of control inserts disposed in the housing wall.

5. The switch of claim 4 comprising said thumbwheel having a plurality of finger engageable projections, each co-acting with a respective V-shaped groove disposed in a continuous manner about the axle of said thumbwheel.

6. The switch of claim 5 comprising said cover plate having an integral centrally disposed cylindrical boss having at least one spring loaded arresting ball adapted to engage a respective V-shaped groove of said thumbwheel to lock the rotation thereof and also having an axle receiving bearing centrally disposed therein.

7. The switch of claim 5 having circumferentially disposed threaded apertures about the axle receiving bearing, a pair of adjustably threaded stop pins removably disposed in said threaded apertures and adapted to engage said abutment of said thumbwheel to limit the rotation thereof.

8. The switch of claim 7 comprising a cover plate having a pair of elongated apertures, each predeterminedly located to co-act with a pair of movable poles on the X-side of the card.

9. The switch of claim 7 having leaf spring poles adapted to effect a shorting electrical effect upon rotation of said thumbwheel.

10. The switch of claim 7 having leaf spring poles adapted to produce a non-shorting electrical effect upon rotation of said thumbwheel.

References Cited

UNITED STATES PATENTS 3,222,465   12/1965   Huntress et al.

LARAMIE E. ASKIN, *Primary Examiner.*

J. R. SCOTT, *Assistant Examiner.*